No. 714,853. Patented Dec. 2, 1902.
F. G. BATES & B. A. WILLIAMS.
GAS OR VAPOR ENGINE.
(Application filed July 13, 1899.)
(No Model.) 3 Sheets—Sheet 1.

No. 714,853. Patented Dec. 2, 1902.
F. G. BATES & B. A. WILLIAMS.
GAS OR VAPOR ENGINE.
(Application filed July 13, 1899.)

(No Model.) 3 Sheets—Sheet 3.

Witnesses:—
Louis M. Whitehead.
Hamilton D. Turner.

Inventors:—
Francis G. Bates.
Benjamin A. Williams
by their Attorneys:—

UNITED STATES PATENT OFFICE.

FRANCIS G. BATES AND BENJAMIN A. WILLIAMS, OF PHILADELPHIA, PENNSYLVANIA.

GAS OR VAPOR ENGINE.

SPECIFICATION forming part of Letters Patent No. 714,853, dated December 2, 1902.

Application filed July 13, 1899. Serial No. 723,682. (No model.)

*To all whom it may concern:*

Be it known that we, FRANCIS G. BATES and BENJAMIN A. WILLIAMS, citizens of the United States, and residents of Philadelphia, Pennsylvania, have invented certain Improvements in Gas or Vapor Engines, of which the following is a specification.

One object of our invention is to so construct a gas-engine that the same can be readily adapted for use either as an engine of the four-cycle type or as an engine of the two-cycle type, a further object being to permit supplemental exhaust of the spent gases from the cylinder of the engine after the piston, on the back stroke, has covered the main exhaust, and a still further object being to provide for readily governing or regulating the engine. These objects we attain in the manner hereinafter set forth, reference being had to the accompanying drawings, in which—

Figure 1:
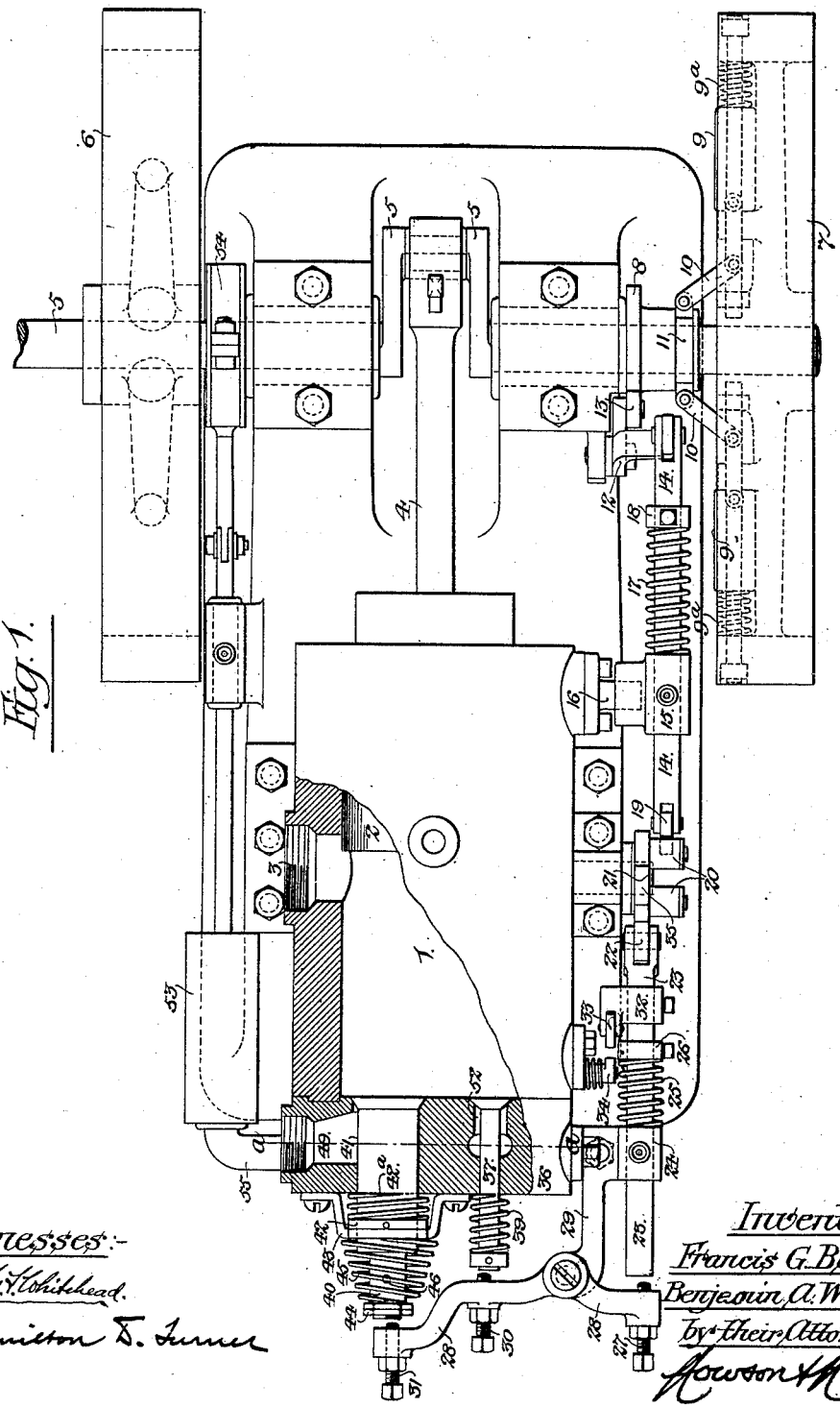
Figure 2:
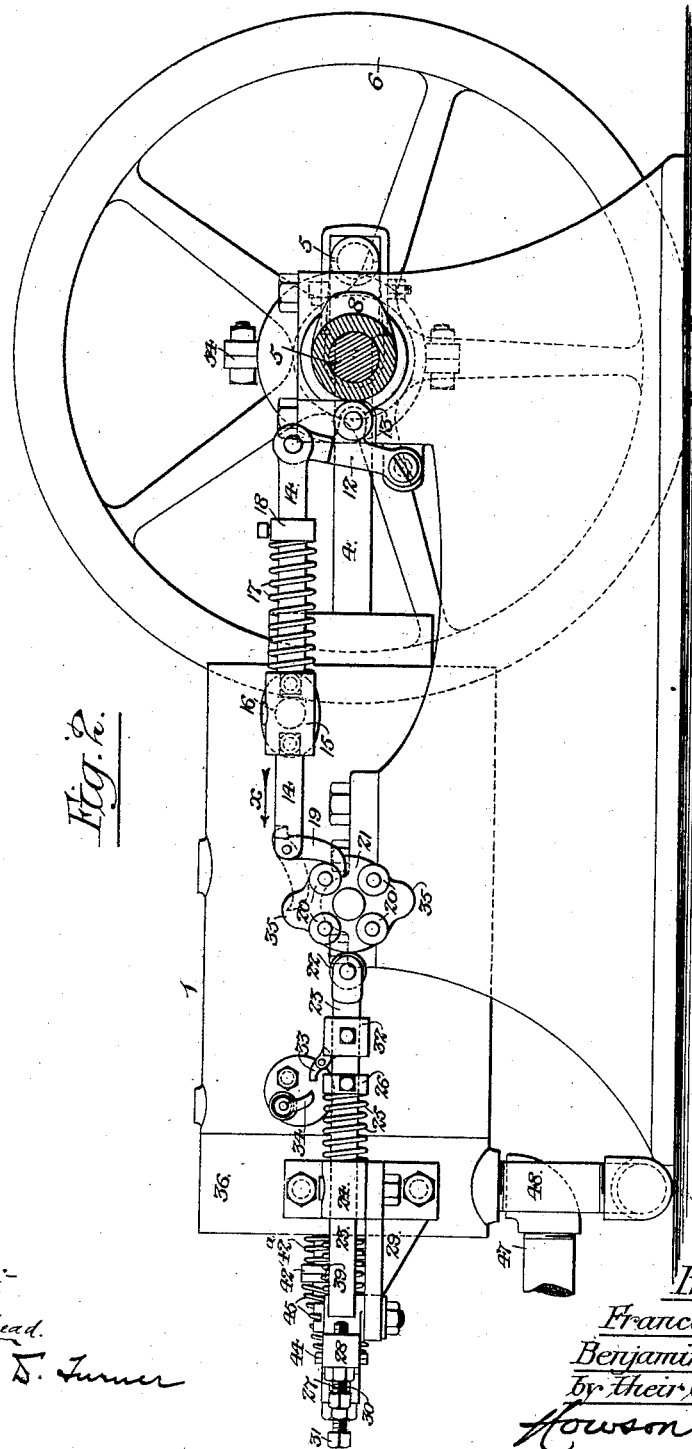
Figure 3:
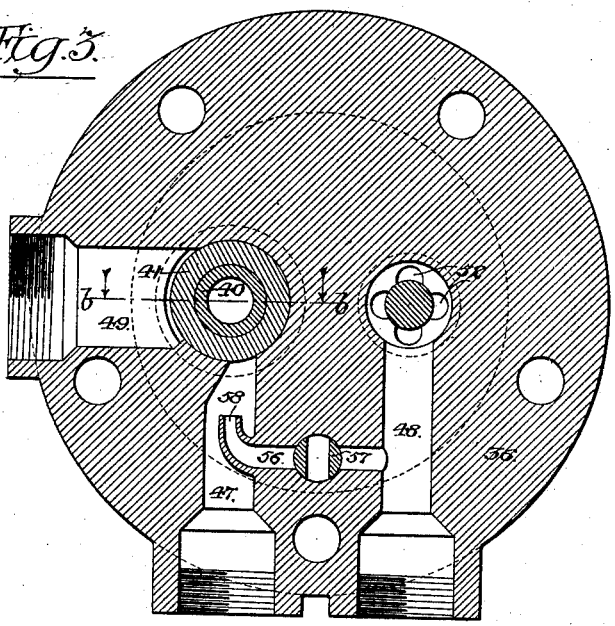
Figure 4:
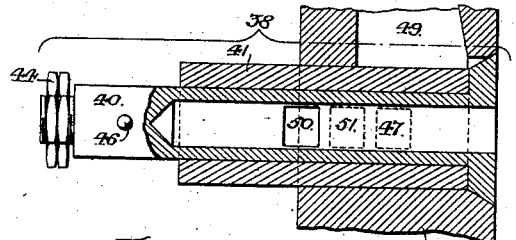
Figure 5:
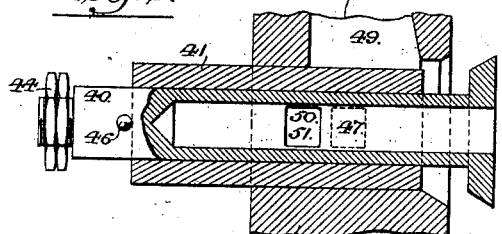
Figure 6:
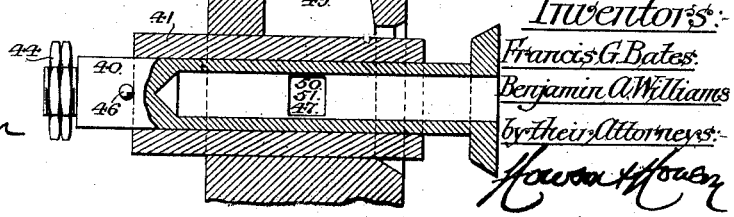

Figure 1 is a plan view, partly in section, of a gas-engine constructed in accordance with our invention and operating as an engine of the four-cycle type. Fig. 2 is a side elevation of the same. Fig. 3 is an enlarged transverse section on the line *a a*, Fig. 1; and Figs. 4, 5, and 6 are views showing in three different positions the combination supplementary exhaust and gas-admission valve forming part of the engine.

The cylinder of the engine, which is represented at 1, may be similar to that of any of the usual types of single-acting gas-engines, the cylinder having a reciprocating piston 2, which at the forward end of its stroke uncovers an exhaust-port 3 in the side of the cylinder, so as to permit of the escape of the greater portion of the spent gases resulting from the explosion whereby the active forward movement or impulse was imparted to the piston.

The piston-rod 4 operates the crank-shaft 5, which has fly-wheels 6 and 7, one of said fly-wheels—in the present instance the wheel 7—being provided with any suitable form of centrifugal governor, whereby the position of a laterally-sliding cam 8 on the crank-shaft is determined. The governor shown in the drawings consists of sliding weights 9, guided radially on the fly-wheel 7 and thrown outward by centrifugal force against the action of springs $9^a$, these sliding weights being connected to links 10, which are hung to a collar 11, adapted to a groove in the hub of the cam 8, so that as the weights are moved outward on the fly-wheel said cam 8 will be drawn along on the shaft toward the fly-wheel.

Hung to a suitable stud on the crank-shaft bearing is a lever 12, which carries an antifriction-roller 13, and when the cam 8 is in the position shown in Fig. 1—that is to say, in a position farthest from the fly-wheel 7, corresponding with a contracted position of the sliding weights 9—the cam will strike the antifriction-roller 13 on each rotation of the crank-shaft and will hence cause vibration of the lever 12. When, however, owing to an undue increase in speed of the engine from any cause, the sliding weights 9 are thrown outward by centrifugal force to such an extent as to withdraw the cam 8 laterally away from the antifriction-roller 13, the vibration of the lever 12 will be arrested until by the slowing down of the engine the parts are again restored to the operative position shown in Fig. 1.

The lever 12 is connected to a rod 14, which is adapted to slide in and is guided by a bearing 15, pivoted so as to swing on a stud 16 at the side of the cylinder, a coiled spring 17 being interposed between this bearing and a collar 18 on the rod 14, so as to move the lever 12 back to its normal position or position of rest after it has been acted upon by the cam 8.

The rear end of the rod 14 carries a pawl 19, so mounted upon the rod that it is prevented from yielding when it comes into contact with any object on the rearward movement of the rod—that is to say, movement in the direction of the arrow *x*, Fig. 2—but is free to swing upward when brought into contact with any object on the forward movement of the rod. This pawl 19 acts upon antifriction-rollers 20, carried by studs projecting from the face of a cam-disk 21, mounted so as to be free to turn upon a suitable shaft or stud on the frame of the machine.

The cams of the disk 21 act upon an antifriction-roller 22, carried by the forward end of a rod 23, which is guided in a suitable bearing 24 and is acted upon by a coiled spring 25, interposed between said bearing and a collar 26 on the rod, the tendency of this spring being to move the rod forwardly after it has been acted upon by a cam of the disk 21. The rear end of the rod 23 acts upon an adjustable set-screw 27, carried by one arm of a lever 28, which is hung to a bracket 29 at the rear of the cylinder 1, the other arm of said lever 28 carrying two adjustable set-screws 30 and 31, adapted to act upon the stems of certain valves, referred to hereinafter. The rod 23 has another collar 32, which carries a pivoted tapper 33, adapted to act upon the swinging arm 34 of an electric igniting device of any ordinary character mounted upon the cylinder.

In the present instance the cam-disk 21 has two oppositely-disposed cams 35 and four antifriction-rollers 20, so that on each rotation of the crank-shaft of the engine movement to the extent of a quarter of a turn will be imparted to the cam-disk. Hence there will be an operation of the lever 28 and of the valves acted upon thereby for every two rotations of the crank-shaft. This arrangement is adopted when the engine is intended to be one of the four-cycle type, in which the mixture of gas and air is drawn into the rear end of the cylinder on one outward stroke of the piston, compressed therein on the next inward stroke, and then exploded, so as to impart the next outward or active stroke of the piston, the spent gases being discharged from the cylinder on the next inward stroke of the piston. When, however, it is desired to run the engine as one of the two-cycle type, in which the mixture of air and gas is admitted to the cylinder at the beginning of each stroke, the cam-disk 21 may have four cams instead of two, or the cam-disk may be dispensed with altogether, and the toe 19 of the rod 14 may act directly upon the antifriction-roller 22 of the rod 23, or said rod 23 may simply form a continuation of the rod 14.

At the rear end of the cylinder 1 is a valve-chest 36, containing two valves, the valve 37 being an ordinary beveled disk-valve, normally held closed against its seat by the action of a spring 39, but the other valve being of peculiar construction, as illustrated in Figs. 4, 5, and 6, on reference to which it will be observed that said valve comprises a tubular stem 40 with beveled flange at the inner end, said stem being surrounded by a sleeve 41, which projects beyond the valve-chest and has a collar 42, acted upon by a spring 42ª, tending to move said sleeve outwardly. The sleeve 41 is guided by a bracket 43, and between said bracket and nuts 44 at the outer end of the valve-stem 40 is interposed a coiled spring 45, the tendency of which is to move said stem 40 in an outward direction. A pin 46, projecting from the stem 40, acts upon the outer end of the sleeve 41 when said stem 40 is moved inwardly, and thus causes like inward movement of said sleeve 41, outward movement of the latter being restricted by contact of its collar 42 with the bracket 43, and outward movement of the stem 40 being restricted by contact of its beveled flange with the seat in the valve-chest.

In the valve-chest of the cylinder are formed a gas-inlet passage 47, an air-inlet passage 48, and a spent-gas exhaust-passage 49, and in the hollow stem 40 of the valve 38 is formed a port 50, which on the inward movement of said stem can be brought into line with a port 51, formed in the sleeve 41, as shown by dotted lines in Fig. 4, inward movement of said sleeve 41 then bringing both ports 50 51 into line with the gas-inlet passage 47.

In the operation of the engine the hollow stem 40 is first moved forwardly, so as to carry its beveled flange away from the seat and permit the escape of the spent gases from the rear end of the cylinder to the auxiliary exhaust-passages 49, as shown in Fig. 5. This same movement brings the port 50 into line with the port 51, and further inward movement of the hollow stem 40 is then accompanied by like movement of the sleeve 41 until the ports are in line with the gas-inlet passage 47, as shown in Fig. 6, whereupon gas is admitted to the cylinder through the hollow stem 40. At the same time the valve 37 is opened, so as to permit the inflow of air into the cylinder for admixture with the gas. The passages 52 for the flow of air into the cylinder when the valve 37 is opened are formed in the valve-seat instead of in the valve-stem, as shown in Figs. 1 and 3, this construction permitting the use of a plain cylindrical stem on the valve, so that the latter can be readily turned in a lathe.

When it is desired to use the engine as one of the two-cycle type, an air-compressor 53, located at one side of the cylinder 1, is employed, the plunger of this compressor being operated by an eccentric 54 on the shaft of the engine. The compressor communicates through a pipe 55 with the air-inlet port 48, and from the latter to the gas-inlet port 47 extends a passage 56, containing a valve 57, whereby the flow of air through the passage may be permitted or cut off, as desired. The passage 56 terminates in a nozzle 58 in the gas-inlet passage 47, so that the inflow of air under pressure will act to cause inflow of gas and will carry the latter into the cylinder against the pressure therein when the valve 37 is opened, or the valve 37 under these conditions may be allowed to remain closed and the air under pressure admitted to the cylinder through the passage 56, nozzle 58, and gas-inlet passage 47, carrying the proper supply of gas with it.

Having thus described our invention, we claim and desire to secure by Letters Patent—

1. The combination in a gas-engine, of a piston, a cylinder therefor provided with an exhaust-passage and a gas-inlet passage, both opening into a common chamber, valves within said chamber provided with openings placed to communicate with each other and with said passages, and means for operating the valves, substantially as described.

2. The combination in a gas-engine, of an exhaust-passage at the rear end of the cylinder, a gas-inlet passage also at the rear end of the cylinder, a valve closing the movable exhaust-passage and having a hollow stem, a movable sleeve surrounding said hollow stem, ports in said valve-stem and sleeve, and means for operating the valve-stem and sleeve successively whereby the ports are first brought into line and are then caused to register with the gas-inlet, substantially as specified.

3. The combination in a gas-engine, of a cylinder having a piston and provided with an exhaust and a gas-inlet passage, both opening into a common chamber, valves within said chamber having openings acting in conjunction with each other and with said passages for controlling the flow of gas therethrough, a lever, and means for operating the same, said lever engaging said valves successively during its movement, substantially as described.

4. The combination in a gas-engine, of a cylinder-head serving as a valve-chest provided with a gas-inlet passage, a valve in said passage operated by the engine, an air-compressor, said cylinder-head also having a passage connected to the air-compressor, the same terminating in a nozzle in the gas-inlet passage, substantially as described.

5. The combination in a gas-engine of a cylinder-head serving as a valve-chest provided with a valve-controlled gas-inlet passage and a valve-controlled air-inlet passage, valves for the same having means whereby they are operated from the engine, and an air-compressor, said cylinder-head also having a valved passage connected to the air-compressor terminating in said gas-inlet passage, substantially as described.

6. In a gas-engine the combination of a cylinder-head serving as a valve-chest, having air and gas inlet passages and an exhaust-passage, valves operated by the engine for said passages, there being an additional passage between the air and gas passages, a valve in said additional passage whereby said air and gas passages may be connected or disconnected at will, substantially as described.

7. In a gas-engine the combination of a cylinder-head serving as a valve-chest having air and gas inlet passages and an exhaust-passage, a valve for said exhaust-passage provided with a tubular stem, a sleeve on said stem, said stem and said sleeve each having an opening whereby the gas-inlet passage is connected with the hollow interior of said valve-rod when the engine is operated, substantially as described.

8. In a gas-engine, the combination of a cylinder-head serving as a valve-chest having air and gas inlet passages and an exhaust-passage, a valve for the air-inlet passage and a valve for the exhaust-passage constructed to act also as means for controlling the flow of gas from the gas-passage to the cylinder, substantially as described.

9. In a gas-engine the combination of a cylinder-head serving as a valve-chest having air and gas inlet passages and an exhaust-passage, a valve for the exhaust-passage having a tubular stem, said stem being provided with an opening placed to periodically register with the gas-inlet passage when the engine is operated, substantially as described.

10. In a gas-engine the combination of a cylinder-head serving as a valve-chest having air and gas inlet passages and an exhaust-passage, there being an opening through said cylinder-head into which said gas-passage opens and a valve in said passage consisting of two coöperating tubular sections constructed to regulate both the flow of fluid into the exhaust-passage and the flow of gas from said gas-inlet passage to the cylinder, substantially as described.

11. In a gas-engine, the combination of a cylinder, a piston therein, said cylinder having air or gas inlet passages and an exhaust-passage, valves for said passages, a reciprocating rod, mechanism operatively connecting said rod with the valves, a revolubly-supported cam placed to engage said rod, with mechanism connected to the engine-shaft and also constructed to engage said cam for intermittently turning the same, substantially as described.

12. The combination of a cylinder having a piston and provided with air or gas inlet passages, and an exhaust-passage, valves for said passages, a reciprocating rod and mechanism connecting said rod with the valves for operating the same, a revolubly-supported cam in yielding engagement with said rod, projections from the said cam and a second reciprocating rod actuated from the engine-shaft engaging said projections intermittently whereby said cam is periodically moved, substantially as described.

In testimony whereof we have signed our names to this specification in the presence of two subscribing witnesses.

FRANCIS G. BATES.
BENJ. A. WILLIAMS.

Witnesses:
F. E. BECHTOLD,
JOS. H. KLEIN.